(12) United States Patent
Bergeron et al.

(10) Patent No.: US 7,658,894 B2
(45) Date of Patent: Feb. 9, 2010

(54) METHOD FOR INCREASING THE CHROME TO IRON RATIO OF CHROMITES PRODUCTS

(75) Inventors: Mario Bergeron, Cap-Rouge (CA); Marc Richer-Laflèche, Sainte-Foy (CA)

(73) Assignee: Ressources Minieres Pro-OR Inc., Montreal, Quebec (CA)

( * ) Notice: Subject to any disclaimer, the term of this patent is extended or adjusted under 35 U.S.C. 154(b) by 399 days.

(21) Appl. No.: 10/544,214

(22) PCT Filed: Feb. 6, 2004

(86) PCT No.: PCT/CA2004/000165

§ 371 (c)(1),
(2), (4) Date: Jan. 11, 2006

(87) PCT Pub. No.: WO2004/070066

PCT Pub. Date: Aug. 19, 2004

(65) Prior Publication Data

US 2006/0123951 A1    Jun. 15, 2006

Related U.S. Application Data

(60) Provisional application No. 60/445,437, filed on Feb. 7, 2003.

(30) Foreign Application Priority Data

Feb. 6, 2003    (CA) .................................... 2418546

(51) Int. Cl.
*C22B 34/32*    (2006.01)
*C01G 37/033*    (2006.01)
*C01G 49/10*    (2006.01)
(52) U.S. Cl. ........................................ 423/53; 423/149
(58) Field of Classification Search ............... 423/53, 423/59, 60, 149
See application file for complete search history.

(56) References Cited

U.S. PATENT DOCUMENTS 2,752,301 A    6/1956    Cooper
4,047,934 A    9/1977    Pollard et al.

FOREIGN PATENT DOCUMENTS

| EP | 0 096 241 | 12/1983 |
| GB | 1567841 | 5/1980 |
| WO | 97/46724 | 12/1997 |
| ZA | 96/4584 | 2/1997 |

OTHER PUBLICATIONS

Bezukladnikov et al., Zr. Prikl. Khim., 1974, pp. 1770-1773, vol. 47.
Cook et al., J. Phys. Chem., 1961, pp. 1505-1511, 65.
Johnstone et al., J. Am. Chem. Soc., 1942, pp. 241-244, 64.
Kanari et al., Metallurgical and Materials Transactions B, Aug. 1999, pp. 577-587, 30B.
Kanari et al., Metallurgical and Materials Transactions B, Aug. 1998, pp. 729-737, 29B.
Rhee et al. Metallurgical Transactions B, Apr. 1990, pp. 321-330.
Zhao et al. Metallurgical Transactions B, Feb. 1990, pp. 131-133, 21B.

*Primary Examiner*—Wayne Langel
*Assistant Examiner*—James Fiorito
(74) *Attorney, Agent, or Firm*—Ladas & Parry LLP (57) ABSTRACT

A method for increasing the chrome to iron ratio of a chromite product selected from the group consisting of ore and ore concentrate comprising the steps of mixing the chromite product with at least one salt so as to produce a mixture, whereby the concentration of salt in the mixture is selected to induce the selective chlorination of iron; and chlorinating the mixture in the presence of CO at a temperature sufficient to induce the formation of a thin film of a melt around the chromite product and at a temperature able to promote the selective chlorination of iron, whereby an iron impoverished chromite product is yielded having an increased chromite to iron ratio as compared to that of the chromite product.

22 Claims, 7 Drawing Sheets

METHOD FOR INCREASING THE CHROME TO IRON RATIO OF CHROMITES PRODUCTS

CROSS REFERENCE TO RELATED APPLICATIONS

This application claims priority on PCT application No. PCT/CA2004/000165 filed on Feb. 6, 2004 and published in English under PCT Article 21(2), on Canadian patent application Ser. No. 2,418,546, filed on Feb. 6, 2003 and U.S. provisional application Ser. No. 60/445,437, filed on Feb. 7, 2003. All documents above are herein incorporated by reference.

FIELD OF THE INVENTION

The present invention relates to a method for increasing the chrome to iron ratio of chromites products. More particularly, it relates to a chlorination method for increasing the chrome to iron ratio of chromites products.

BACKGROUND OF THE INVENTION

In the geological environment, the primary industrial source of chromium is the mineral chromite, which can be represented by the ideal formula $FeO.Cr_2O_3$. In practice, FeO can be partially substituted by other elements such as MgO, CaO, MnO and $Cr_2O_3$ by $Fe_2O_3$ and $Al_2O_3$. These substitutions are at the origin of different types of chromites distinguished, among other things, by their chrome to iron ratios. In the geological environment, the chrome to iron ratios of chromites vary from 1.3 to 4.0 in many stratiform or podiform deposits. Chromites possessing chrome to Iron ratios higher than 3, are rare in nature.

Chromites are employed in the production of ferrochromium, a master alloy in the stainless steel industry. The primary process for the production of ferrochromium from chromites is described by the general reaction: metal oxide+reductant+energy $\Rightarrow$(ferro)metal+reductant oxide. The production of ferrochromium is an energy-intensive process and is generally conducted in an electrical furnace. Ferrochromiums can be divided in three classes based on their carbon content: high carbon ferrochromium containing between 4 to 10% carbon; medium carbon ferrochromium containing between 0.5 to 4% carbon; low carbon ferrochromium containing less than 0.5% carbon. The chrome to iron ratio of the chromite ore used as a feed to the furnace, controls the chromium content of the ferrochromium. The value of the ferrochromium is mainly based on its chromium and carbon contents. The highest prices are obtained for ferrochromium showing high concentration in chromium and low carbon content. Similarly, the chromites economic values are set by their chrome to iron ratios: a chromite with a Cr/Fe ratio of 1.5 being worth less than a chromite with a Cr/Fe ratio of 4. The economic value of these chromium-enriched chromites is increased in their use as enriched product directly and as feed for ferrochromium production.

Hence, there is a need for a method for increasing the chrome to iron ratio of a chromite ore. Methods for achieving this goal have been described.

European Patent No. 0 096 241, by Robinson and Crosby, describes the chlorination of chromites mixed with coke by $Cl_2$ at a temperature ranging between 1000° and 1100° C. The chromites are completely transformed into chlorides and volatilized. The iron chlorides and chromium chlorides are separated according to their respective boiling points. This specific process leads to the formation of pure $CrCl_3$.

South African Patent No. 96/4584 by Lalancette, Bergeron, Bossé, Clerk teaches the chlorination of chromites by $Cl_2$ in the presence of air, no reductant being used. The process is described by two reactions.

The combination of these two reactions results in:

According to this process, the iron is selectively chlorinated and transformed in gaseous $FeCl_3$. While $FeCl_3$ is still in the reaction vessel, this product is rapidly transformed in $Fe_2O_3$ via reaction No. 2. This result in the production of a chromite showing an increase in its chrome to iron ratio with a simultaneous formation and precipitation of $Fe_2O_3$ as hematite in the chlorination reactor. After the chlorination step, the reactor is drained and the hematite is dissolved in concentrated HCl leaving a residue of enrich chromite.

U.K. Patent No. 1,567,841 by Sowden and Rigg teaches the chlorination of $Cr_2O_3.xH_2O$ by $CCl_4$ below 600° C. The resulting product is $CrCl_3$. The reaction at the base of this process is:

Following the chlorination reaction $CrCl_3$ is dissolved in diluted HCl.

Thermodynamic and kinetic studies of the chlorination of chromites and associated oxides such as FeO, $Fe_2O_3$, and $Cr_2O_3$ have also been published by Martirosyan (1978 a, b; Arm. Khim. Zh. 31, pp. 93-99; 100-106) as quoted by Kanari, Gaballah, and Allain (1999, Metallurgical and Materials Transactions B, 30B, pp. 577-587) for instance. These studies were centered on thermodynamic and kinetic considerations and do not teach how to apply these principles to a workable and optimized method. They do not teach the use of a catalyst to increase the efficiency of the reactions.

Chlorination as a general metallurgical approach has also been described. Johnstone, Weingartner and Winsche (1942, J. Am. Chem. Soc., 64, pp. 241-244) observed the formation of a eutectic point when studying the binary system ferric chloride($FeCl_3$)-sodium chloride. Cook, and Dunn (1961, J. Phys. Chem., 65, pp. 1505-1511) refined the phase diagram and presented evidence for the formation of $NaCl.FeCl_3$. Bezukladnikov, Tarat and Baibakov (1974, Zr. Prikl. Khim. 47, pp. 1722-1725); and Zhao, Tian and Duan (1990, Metallurgical Transactions B, 21B, 131-133) studied the solubility of chlorine in different molten salts. These authors concluded that the presence of $FeCl_2$ in molten salts increases by two orders of magnitude the speed of the chlorination reactions. They attributed this increase to the catalyst role played by $FeCl_2$ according to the reaction: $FeCl_2(melt)+0.5Cl_2(gas)=FeCl_3(melt)$. The actual partial pressure of chlorine at the reaction site decreases rapidly causing decomposition of $FeCl_3$ with the liberation of chlorine at the reaction sites. $FeCl_2$ reacted with external chlorine thus regenerating $FeCl_3$. This system increases chlorine diffusion and acts as a transport procedure for chlorine at the reaction sites and accelerates the chlorination process.

It is apparent from the foregoing that known methods for chlorinating chromites result either in the production of $CrCl_3$ because of the temperatures used (i.e. 1000° C.) or in the formation of secondary hematite ($Fe_2O_3$) that has to be leached by concentrated. HCl in order to produce chromites showing high chrome to iron ratios. Furthermore, thermodynamic and kinetic studies on chlorination of iron have not incorporated the effect of the catalyst role played by $FeCl_2$, $FeCl_3$ in the presence of molten salts and they do not integrate the required systems for the set up of a commercial process such as those taking account environmental requirements. Furthermore, these studies do not teach how to avoid potential problems related to the consumption of chlorine by others oxidic constituents occurring in the natural spinels structure of chromites and in other silicated phases associated with the ore.

Investigations on the chemical compositions of chromites from the Menarik Complex, Bay James, Québec, Canada, have showed that the oxidic components of the chromite ores are highly variable. Table 1 shows chemical analysis performed by an electron micro-probe of chromite grains extracted from Cr-3 chromite showing of the Menarik Complex. These results indicate important variations in the major oxides phases on a grain-to-grain basis. The average chemical composition of the Cr-3 mineralized zone is reported in the Table 2 with the heading Starting ore.

only, since various changes and modifications within the scope of the invention will become apparent to those skilled in the art.

SUMMARY OF THE INVENTION

The present invention generally provides a novel approach for the extraction of iron from chromites.

In a specific embodiment, it also provides a method for extracting iron from chromites without substantially affecting other major chemical components in chromites.

The present invention is applicable to chromites products such as chromite ores and different types of chromite concentrates including alluvial chromites. If concentrates are used as feed to the invention, the concentrates can be obtained, after grinding of the ore, by the use of standard mineral processing technologies such as jigs, spirals, flotation units, and multi-gravity separator.

The size of the chromite product used depends on the degree of freedom of the chromite grain-size in the matrix from which it is extracted.

According to a further embodiment, the present invention may comprise procedures allowing secure disposal of the iron extracted from the chromites. The method may then further comprises any of the steps of washing the $FeCl_3$ condensate

TABLE 1

Chemical analysis of chromite grains by electron micro-probe, Menarik Cr-3 chromite

| Sample No. | MgO % | $Al_2O_3$ % | $SiO_2$ % | $TiO_2$ % | $V_2O_3$ % | $Cr_2O_3$ % | MnO % | FeO % | Cr/Fe N/A |
|---|---|---|---|---|---|---|---|---|---|
| Cr3-26 | 7.74 | 17.23 | 0.00 | 1.28 | 0.58 | 45.59 | 1.23 | 26.36 | 1.52 |
| Cr3-27 | 3.98 | 17.59 | 0.00 | 0.50 | 0.35 | 41.81 | 1.82 | 33.95 | 1.08 |
| Cr3-37 | 2.93 | 16.45 | 0.00 | 0.00 | 0.36 | 44.87 | 1.19 | 34.19 | 1.16 |
| Cr3-35 | 2.58 | 17.41 | 0.79 | 1.02 | 0.95 | 40.81 | 1.97 | 32.14 | 1.12 |
| Cr3-29 | 1.83 | 15.67 | 0.00 | 0.00 | 0.87 | 42.77 | 1.72 | 36.01 | 1.05 |
| Cr3-28 | 1.75 | 3.10 | 0.98 | 0.00 | 0.00 | 44.72 | 1.27 | 48.17 | 0.82 |
| Cr3-44 | 2.73 | 5.92 | 0.82 | 0.72 | 0.79 | 42.10 | 0.93 | 46.00 | 0.81 |
| Cr3-43 | 1.48 | 5.23 | 0.49 | 0.00 | 1.25 | 41.06 | 2.68 | 47.81 | 0.76 |

N/A: not applicable.

There thus remains a need to develop an effective method for the selective extraction of iron from heterogeneous natural chromites in such a way that other oxides such as CaO, MgO, MnO, $SiO_2$, $TiO_2$, $Cr_2O_3$ are left substantially unaffected by the method and through means that are secure for the environment. There also remains a need for a method able to extract the iron without the need to dissolve the hematite coatings on chromites with concentrated HCl, a complicated and expensive procedure. There also remains a need for a method including a catalyst component to accelerate the chlorination process and efficient environmental and recycling systems.

It is an object of the present invention to provide an improved method of increasing the chromium/iron ratio of chromites.

Other objects and further scope of applicability of the present invention will become apparent from the detailed description given hereinafter. It should be understood, however, that this detailed description, while indicating preferred embodiments of the invention, is given by way of illustration with an aqueous solution to yield an aqueous solution rich in $FeCl_3$; reacting gaseous $Cl_2$ with metallic iron to yield an aqueous solution of $FeCl_3$; neutralizing the aqueous solution rich in $FeCl_3$ with NaOH by the reaction $FeCl_3(aq)+3NaOH(aq) \Rightarrow Fe(OH)_3(s)+3NaCl(aq)$ to yield an aqueous solution containing NaCl and an iron hydroxides precipitate; separating the aqueous NaCl solution from the iron hydroxides precipitate to yield a clearer aqueous NaCl solution and a iron hydroxides cake filter, the iron oxide cake being disposable in a regulated tailing pound;

According to a further embodiment, the present invention comprises procedures allowing recycling of other principal chemical reactants employed in the process. The method then comprises burning CO with air to yield gaseous $CO_2$; electrolyzing the NaCl solution to yield $Cl_2$, NaOH and $H_2$; recycling at least one of $Cl_2$ and NaOH as reactants for the chlorination and neutralization reactions; recycling $H_2$ as additional combustible for the chlorination furnace; and recovering the solid material from which the iron has been extracted by the chlorination reaction. In a specific embodiment, the chlorination is performed in a furnace built with material resistant to chlorine, to yield a $FeCl_3$ gaseous stream and a solid material from which the iron has been extracted and whereby residual chlorine may exit the furnace.

According to a further embodiment, the present invention comprises means to minimize the production of Cr+6, a known carcinogen contaminant that may be produced in methods using HCl. In a specific embodiment, the means include using a reducing atmosphere during the gas solid interactions.

As used herein, the terminology "temperature sufficient to induce the formation of a thin film of a melt around the chromite product" refers to a temperature that is sufficient to promote the formation of a $FeCl_3$—NaCl system that is liquid. This temperature is at least 157° C. and preferably at least 250° C.

As used herein, the terminology "temperature able to promote the selective chlorination of iron" refers to a temperature that is not sufficiently high to enable the chlorination of other oxides in the chromites. Hence, it is known that at a temperature of 1000° C. and higher, all oxides contained in the chromites are chlorinated. In a specific embodiment, the temperature used for this purpose is not higher that 750° C. In a more specific embodiment, this temperature is not higher than 720° C.

According to an embodiment of the present invention, there is provided a method for increasing the chrome to iron ratio of a chromite product selected from the group consisting of ore and ore concentrate comprising the steps of mixing the chromite product with at least one salt so as to produce a mixture, whereby the concentration of salt in the mixture is selected to induce the selective chlorination of iron; and chlorinating the mixture in the presence of CO at a temperature sufficient to induce the formation of a thin film of a melt around the chromite product and at a temperature able to promote the selective chlorination of iron, whereby an iron impoverished chromite product is yielded having an increased chromite to Iron ratio as compared to that of the chromite product.

In specific embodiments, the temperature is between about 157° and about 750° C. In further embodiments, the temperature may be between about 250° and about 720° C. In more specific embodiments, the temperature is between about 670° and about 720° C. In other specific embodiments, the at least one salt is selected from the group consisting of NaCl, KCl and $MgCl_2$ and a combination thereof. In a more specific embodiment, the salt is NaCl and forms about 5% to about 10% w/w of the mixture. In more specific embodiments, the salt forms about 5% w/w of the mixture. In other specific embodiments, the $Cl_2$/CO ratio is between about 0.5 and about 1.5. In other specific embodiments, the mixture is dried before chlorination. In other embodiments, $N_2$ is used as a carrier gaz during chlorination. In other embodiments, the duration of the chlorination is about 30 minutes to about 2 hours. In other embodiments, the duration of the chlorination is about 2 hours.

According to an other embodiment of the present invention, there is provided a method for increasing the chrome to iron ratio of a chromite product selected from the group consisting of ore and ore concentrate comprising the steps of mixing the chromite product with NaCl so that a mixture is produced having about 5% to about 10% NaCl w/w; and chlorinating the mixture in the presence of CO at a temperature sufficient to induce the formation of a thin film of a melt around the chromite product and at a temperature able to promote the selective chlorination of iron, whereby an iron impoverished chromite product is yielded having an increased chromite to iron ratio as compared to that of the chromite product.

In more specific embodiments, the temperature is between about 157 and about 750° C. In further embodiments, it may be between about 250° and about 720° C. or between about 670° and about 720° C. In other specific embodiments, the salt forms about 5% w/w of the mixture. In other specific embodiments, the $Cl_2$/CO ratio is between about 0.5 and about 1.5. In other specific embodiments, the mixture is dried before chlorination. In other embodiments, $N_2$ is used as a carrier gaz during chlorination. In other embodiments, the duration of the chlorination is about 30 minutes to about 2 hours. In other embodiments, the duration of the chlorination is about 2 hours.

According to an other embodiment of the present invention, there is provided a method for extracting iron from a chromite product selected from the group consisting of ore and ore concentrate comprising the steps of mixing the chromite product with at least one salt; and chlorinating the mixture in the presence of CO at a temperature sufficient to induce the formation of a thin film of a melt around the chromite product so as to promote the chlorination of iron, whereby an iron impoverished chromite product is yielded.

According to specific embodiments, it may be desired to promote a selective chlorination of iron (i.e. use chlorination conditions where only or almost only iron is chlorinated). This is desired when the method seeks to produce an upgraded chromite product having a higher Cr/Fe ratio. In these embodiments, if the salt used is NaCl, it is optimally between 5% and 10% w/w in the mixture and the temperature is below 1000° C. and preferably not more than 750° C. In other embodiments, the method may simply seek to extract as much iron as possible and not preserve a high chrome content in the chromite or avoid chlorination of other oxides. Then the chlorination temperature used and the salt concentration used do not have to be selective and is desirably higher than 1000° C. and 10% w/w, respectively.

DESCRIPTION OF THE PREFERRED EMBODIMENT

Figure 1:
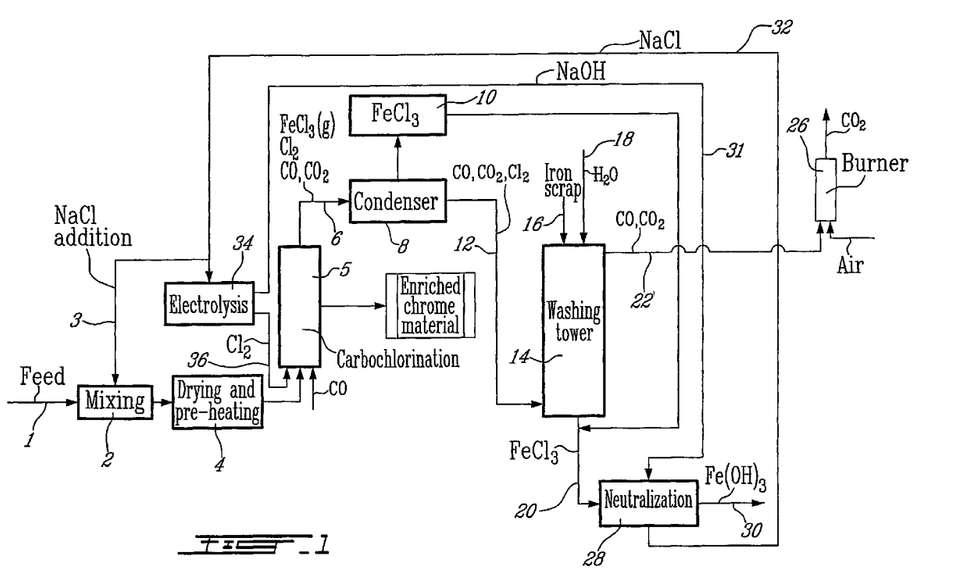
FIG. 1 illustrates a flow diagram according to a specific embodiment of the present invention.

Referring to FIG. 1, the feed (1) used can be ore or an ore concentrate obtained from an appropriate mineral processing technology. In Examples presented below, on the feed used is from a massive chromite layer obtained from the Menarik deposit (James Bay, Quebec). The average mineralogy of 29 massive chromite layers of the Menarik Complex is: chromite 45%, chlorite 32%, serpentine 13%, magnetite 3%, talc 1%, hornblende 4%, and traces of sulfides. The sample was hand picked from the chromite mineralized zone Cr-3 and subsequently ground to 125 µm. The chemical composition of this starting material, identified as feed (1) in FIG. 1, is reported in Table 2 as starting ore for Examples 1 and 2, and in Table 3 as starting ore for Examples 3 to 6.

Mixing (2)

Figure 2:
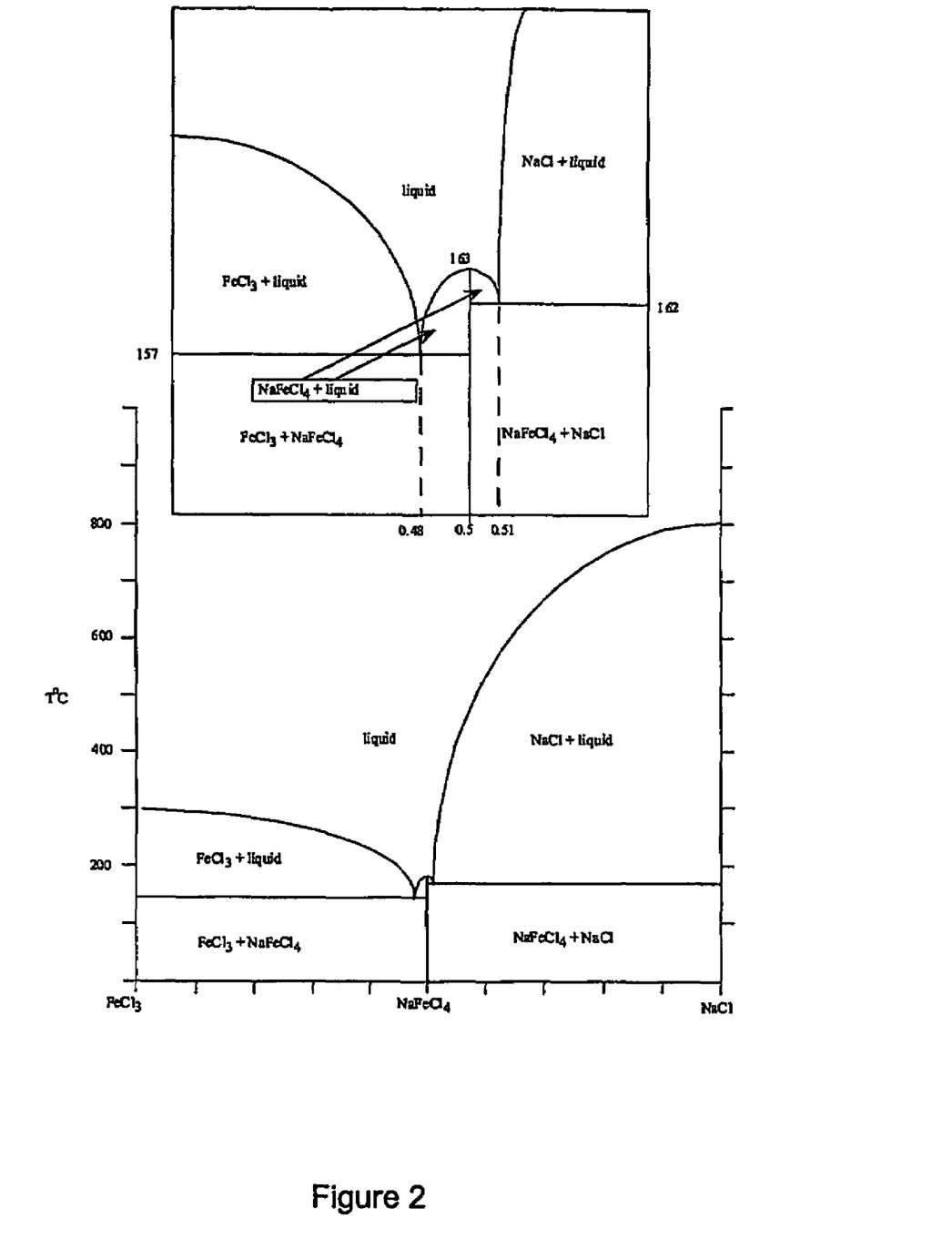
FIG. 2 graphically illustrates a phase diagram of a system $FeCl_3$—NaCl, adapted from Cook and Dunn (1961)

NaCl (3) was added to the ground ore as a solution in order to obtain a concentration (w/w) of salt in the feed varying between 0.8% and 15% according to Examples 1 to 6 below. The NaCl salt addition provides one of the components for the formation of an eutectic point which the $FeCl_3$ produces via the carbochlorination of the chromite feed (reactions are reported under the carbochlorination heading below). The phase diagram for the system $FeCl_3$—NaCl is illustrated at FIG. 2.

For temperatures over the first eutectic temperature, 157° C., liquid $NaFeCl_4$ is formed from the reaction of $FeCl_3$ with NaCl. In Examples presented below, the chlorination temperature varies from 250° to 720° C. According to the phase diagram of FIG. 2, $NaFeCl_4$ is present as a liquid phase in the feed at all chlorination temperatures used. In the present Invention, the salt addition is performed in order to produce a thin film of a melt around each grain of the feed. This interstitial melt contains the chlorination agent in a chemical form such as $NaFeCl_4$. The thin film acts as a chlorination solvent increasing chlorine diffusion in the chromite. The chlorine gaseous atmosphere enclosed in the reactor regenerates the effective chlorination agent contained in the melt. It is understood from the person of ordinary skill in the art that other types of salts such as KCl and $MgCl_2$ can be used to produce a catalytic system for the carbochlorination of chromites.

Drying and Pre-Heating (4)

The drying step ensures a complete removal of water resulting from the salt addition and can be carried out at different temperatures and time periods. In Examples presented below, the mixture was dried at 180° C. for 30 minutes. After cooling, the charge was transferred in the chlorination reactor and pre-heated at the selected reaction temperature.

Carbochlorination

Theory

The chemical reaction occurring during carbochlorination is the following:

$$FeO.Cr_2O_3 + 1.5Cl_2(g) + CO(g) \Rightarrow Cr_2O_3 + FeCl_3(g) + CO_2(g) \qquad 4.$$

Figure 3:
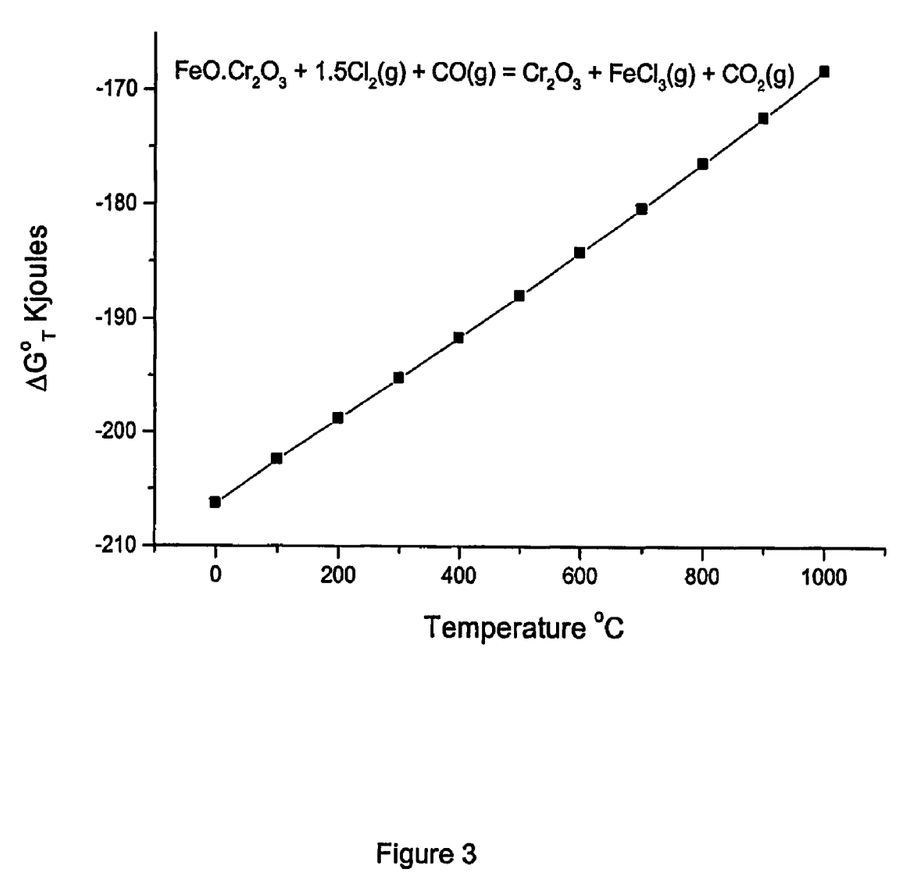
FIG. 3 graphically illustrates the carbochlorination of chromites, $\Delta G$oT versus T.

The $\Delta G°_T$ versus temperature of this reaction was calculated using the HSC™ software of Outokumpu. They are presented at FIG. 3. For the rangef of temperatures considered, the $\Delta G°_T$ values were inferior to −150 Kjoules. This demonstrates the thermodynamic feasibility of the reaction. According to reaction 4, the iron contained in the chromite reacts with $Cl_2$ to form $FeCl_3$. At the temperature range described Examples presented below, 250° to 673° C., $FeCl_3$ is in a vapour state. Because of the continuous flow of gas passing through the reactor, $FeCl_3$ is carried outside the reactor, where it is condensed. An acceptor such as CO(g) for the oxygen liberated during the chlorination reaction may be added to maintain reducing conditions. The addition of CO(g) limits the probability that the reaction $2FeCl_3 + 3/2O_2 = Fe_2O_3 + 3Cl_2$ will occur. Thereby, no detectable precipitation of unwanted solid hematite takes place in the reactor.

Another significant reaction occurring according to the process of the present invention is the formation of ferrous chloride $FeCl_2$ during the carbochlorination phase. Ferrous chloride ($FeCl_2$) having a high melting point of 670° C., hence a temperature higher than that used during the carbochlorination according to certain embodiments of the present invention, a rapid chlorination of $FeCl_2$ into ferric chloride ($FeCl_3$) according to the reaction $2FeCl_2 + Cl_2 \Rightarrow 2FeCl_3(g)$ may be desirable in these specific embodiments in order to avoid the production of a diffusion barrier by the formed solid ferrous chloride. This barrier may decrease the chlorine access to the reaction sites. Rhee and Shon (1990, Metallurgical Transactions B, 21B, pp. 321-330) reported data on the carbochlorination of ilmenite ($FeO.TiO_2$), a product presenting similarities to chromites when chlorinated. They showed that the kinetics follow a pore-blocking rate law. Zhao, Tian and Duan (1990, Metallurgical Transactions B, 21B, 131-133) studied the equilibrium between ferrous and ferric chloride in molten chloride salts. They concluded on the catalytic effect of the combination of salt and iron chloride and also on the volatilization of iron from the salt melt. Their data indicated that volatilization of iron as $FeCl_3$ is maximized when the NaCl content is high. None of these conditions were tested before on chromites.

Hence, in the present invention, carbochlorination is performed with a salt such as NaCl, KCl and $MgCl_2$ to produce a catalytic melt when NaCl combines with $FeCl_2$ and/or $FeCl_3$ so as to increase the volatilization (the removal) of iron as gaseous $FeCl_3$ from the carbochlorination reactor.

Method

When the carbochlorination temperature was reached in the chlorination reactor (5) a mixture of $Cl_2$ and CO and, in specific embodiments, $N_2$ (not shown) was introduced in the reactor so as to induce carbochlorination. After a few minutes, $FeCl_3(g)$ (5) was expelled from the reactor. According to specific embodiments described Examples below, the temperature was varied from 250° to 720° C. However because of thermodynamics rules, it is expected that this temperature may be Increased at least up to 750° C. without loosing the selectivity of the chlorination towards iron. In specific embodiments, chlorine and carbon monoxide were used on a 1/1 basis. The flow rate was maintained at 1 ml per second. In other embodiments, a mixture of $Cl_2$, CO, and $N_2$ was employed, $N_2$ acting as a carrier gas. $N_2$ is not believe to play a role in any reaction involved in the method and may accordingly be dispensed of. In cases where $Cl_2$, CO, and $N_2$ were used, the flow rates of the different gases were varied as well as the weight % of salt additives. Results (not shown) have shown that the optimal $Cl_2$/CO flow rate ratio is between about 0.5 and about 1.5. Interesting results are nevertheless obtained outside this range but the Cr/Fe obtained progressively decreases with ratios below 0.5 or above 1.5 (results not shown).

The chlorination reactions were conducted in a simple horizontal static furnace. Usually, at industrial scale, chlorination is realized in fluidized bed reactors constructed of acid resistant bricks enclosed in a metal shell. Since the salt addition results in the formation of a thin liquid film layer around the chromite grains, which increases their adherence properties, it may be desirable to avoid fluidized reactor in order to avoid problems associated with grains agglomeration and bed sedimentation. Alternatives to fluidized bed reactor include a vertical static reactor and a horizontal rotating reactor.

Other embodiments of the present invention may include the use of solid reducing agents like coal or coke instead of CO which may be onerous for industrial scale methods. When coal and coke are used, they react with oxygen to form CO so that the end result is similar to that obtained when CO is directly introduced in the chlorination reactor. Pelletizing-sintering procedures, similar to the ones employed in the ferrochromium industry, can be performed before the chlorination step.

After the chlorination reaction, the solid upgraded chromites minerals (6) contained in the reactor were dumped.

Depending on the duration of the reaction, the gas flow rate, the salt additives, the $Cl_2/CO$ ratio, the chlorinated solid residue showed an increase in its chrome to iron ratios. The ratios varied from 1.5 in the starting ore before chlorination up to 17 after chlorination. These results are presented in Tables 2-5 below.

Condenser (8)

Gaseous $FeCl_3$ (10) exits continuously the reactor during the reaction and the abrupt temperature drop outside the reactor causes its fast condensation in the top section of the condenser. The condenser is placed at an adequate distance from the furnace so as to keep its temperature below 50° C. so as to ensure $FeCl_3$'s condensation. $FeCl_3$ is highly soluble in water. A small volume of water is added to the condenser apparatus to wash the solid $FeCl_3$. The $FeCl_3$ rich aqueous solution accumulates at the base of the condenser and is directed into a reservoir for subsequent neutralization. The other gases leaving the reactor are essentially $Cl_2$, CO, $CO_2$ (12) and $N_2$ (not shown). These gases are apparently not affected by the presence of the condenser (8) and flow through it without experiencing any detectable change in their compositions or states and exit the condenser.

Washing Tower (14) and Gas Treatment $Cl_2$, CO, $CO_2$ and $N_2$ exiting the chlorination reactor (5) are routed toward a washing tower (14). Scraps of metallic iron (16) in the millimetre range are placed in the tower (14) and sprayed with a small quantity of water (18) in order to keep wet the iron metallic surfaces. This arrangement favors the reaction $Fe(s)+3/2Cl_2 \Rightarrow FeCl_3(aq)$ which consume the unreacted $Cl_2$. After the reaction, $FeCl_3$ is present as a solute (20) in $H_2O$. CO and $CO_2$ (22) percolate up and exit the washing tower near the top. CO is burned as $CO_2$ (24) in an after burner (26) unit. If necessary, by environmental regulations, the scrubbing of $CO_2$ can be achieved by an existing complementary technology (not shown). The aqueous $FeCl_3$ solution flows out at the base of the washing tower to be routed toward the neutralization reservoir.

Neutralization

The aqueous $FeCl_3$ solutions (10) and (20) coming from the condenser (8) and the washing tower are pumped in a neutralization reservoir (28). A solution of NaOH (not shown) is added to the reservoir. The ferric chloride reacts with NaOH to produce $Fe(OH)_3$ (30) according to the reaction:

$$FeCl_3(aq)+3NaOH(aq) \Rightarrow Fe(OH)_3(s)+3NaCl(aq)$$

After completion of the reaction, the solid amorphous iron oxides are isolated from the liquid phase by an appropriate solid-liquid separation such as centrifugation or press filtration (31). The filtration cake is discharged to the tailings. The aqueous NaCl solution (32) is directed to an electrolysis cell (34).

Electrolysis

The NaCl solution (32), obtained from the neutralization step of the process, is electrolyzed by a chlor-alkali membrane cell process. The reaction involved is:

$$2NaCl(aq)+2H_2O \Rightarrow H_2(g)+Cl_2(g)+2NaOH(aq)$$

The gaseous $Cl_2$ and aqueous NaOH generated by the reaction are recycled in the process. The $Cl_2$ is returned (36) to the carbochlorination reactor (5) and the aqueous NaOH is directed (31) in the neutralization reservoir (28). The $H_2(g)$ produced (not shown) by this reaction can be employed as the main energy source or an additional energy source for the carbochlorination reactor (5). External supplies of NaCl can be used if needed.

Any means for routing, transporting and transferring solid, gas, liquid and pulp are within the scope of these inventions. The present invention is described in further details by the following non-limiting examples.

EXAMPLES

The implementation and results of Examples provided herein are summarized in Tables 2-5. Table 2 presents results according to the first set of experiments for which the $Cl_2/CO$ ratio flow rates, reaction time, and type and quantity of salt addition were kept constant during the experiments, while the temperature was varied. Examples 1 and 2 are derived from this first set of experiences. Tables 3 and 4 contain data for the second set of embodiments for which, temperature, reaction time and quantity of salt addition were varied. This second set of experiments is represented in Examples 3 to 6.

The carbochlorination experiments where carried out in a 65 cm long horizontal cylindrical furnace equipped with a type K pyrometer linked to a thermostat controller. Usually, a 10 grams sample was placed in a ceramic beaker and inserted in a silica fused tube. The beaker-tube assembly was then introduced in the furnace.

The major and trace elements were analyzed by inductively couple plasma atomic emission spectroscopy, ICP-AES, after a fusion procedure specifically applicable to chromite. Sulfur was determined with a CNS analyzer.

TABLE 2

| | | | | | | | | | | | | | | | | | |
|---|---|---|---|---|---|---|---|---|---|---|---|---|---|---|---|---|---|
| | | | | Results for experiments conducted with temperature variations | | | | | | | | | | | | | |
| SAMPLE | GAS | T (° C.) | Cr/Fe | $SiO_2$ % | $Cr_2O_3$ % | $TiO_2$ % | $Al_2O_3$ % | $Fe_2O_3T$ % | MnO % | MgO % | CaO % | $Na_2O$ % | $K_2O$ % | $P_2O_5$ % | LOI % | S % | Total % |
| Starting ore | NA | NA | 1.76 | 4.72 | 45.33 | 0.35 | 13.26 | 25.31 | 1.01 | 12.11 | 0.15 | 0.21 | <0.028 | <0.021 | 0.35 | 0.06 | 103.2 |
| Test-01 | Cl-CO | 250 | 1.87 | 4.00 | 47.11 | 0.37 | 13.12 | 24.69 | 0.96 | 10.82 | 0.20 | 0.26 | <0.038 | <0.019 | 0.44 | 0.07 | 102.4 |
| Test-02 | Cl-CO | 350 | 2.15 | 3.96 | 49.29 | 0.38 | 13.48 | 22.46 | 0.82 | 10.43 | 0.20 | 0.26 | <0.044 | <0.022 | 1.59 | 0.08 | 103.3 |
| Test-03 | Cl-CO | 450 | 2.27 | 3.36 | 51.56 | 0.39 | 13.17 | 22.21 | 0.71 | 10.65 | 0.25 | 0.32 | <0.062 | <0.031 | 1.06 | 0.09 | 104.1 |
| Test-04 | Cl-CO | 550 | 2.98 | 2.33 | 52.07 | 0.37 | 14.15 | 17.12 | 0.81 | 12.73 | 0.11 | 0.14 | <0.026 | <0.013 | 0.69 | 0.04 | 100.9 |

$Cl_2/CO$ = 1; 5% NaCl (w/w) addition; LOI: lost on ignition; $Fe_2O_3T$: (T) stand for total iron; Time = 1 hour

TABLE 3

Reaction conditions and results for the second set of experiments.

| SAMPLE | T °C. | NaCl % | Time (h) | F(Cl$_2$) ml/min | F(CO) ml/min | F(N$_2$) ml/min | Weight loss % | Fe$_2$O$_3$ % | Cr$_2$O$_3$ % | Cr/Fe |
|---|---|---|---|---|---|---|---|---|---|---|
| Starting ore | 21 | 0 | 0 | 0 | 0 | 0 | 0 | 25.50 | 47.82 | 1.88 |
| T-2-1 | 600 | 0 | 2 | 220 | 220 | 110 | 11.01 | 15.60 | 49.23 | 3.16 |
| T-2-2 | 600 | 0.8 | 2 | 220 | 220 | 110 | 12.29 | | | |
| T-2-3 | 600 | 4.8 | 2 | 220 | 220 | 110 | 17.75 | 13.80 | 50.11 | 3.63 |
| T-2-4 | 600 | 10.3 | 2 | 220 | 220 | 110 | 17.84 | 12.20 | 46.43 | 3.81 |
| T-2-5 | 600 | 15.0 | 2 | 220 | 220 | 110 | 19.06 | 9.66 | 43.64 | 4.52 |
| T-2-6 | 600 | 4.8 | 1.5 | 220 | 220 | 110 | 16.69 | 14.30 | 50.29 | 3.52 |
| T-2-7 | 600 | 4.8 | 1 | 220 | 220 | 110 | 14.11 | 15.40 | 50.37 | 3.27 |
| T-2-8 | 600 | 4.8 | 0.5 | 220 | 220 | 110 | 12.08 | 16.60 | 49.81 | 3.00 |
| T-2-9 | 673 | 4.8 | 2.0 | 220 | 220 | 110 | 33.96 | 5.24 | 52.83 | 10.08 |
| T-2-10 | 673 | 4.8 | 1.0 | 220 | 220 | 110 | 27.58 | 8.73 | 52.44 | 6.00 |
| T-2-11 | 673 | 4.8 | 0.75 | 220 | 220 | 110 | 24.50 | 10.10 | 52.58 | 5.21 |
| T-2-12 | 673 | 4.8 | 0.5 | 220 | 220 | 110 | 18.79 | 13.6 | 51.66 | 3.80 |
| T-2-13 | 673 | 0 | 0 | 0 | 0 | 0 | 0 | 24.50 | 46.18 | 1.88 |

F: flow rate

TABLE 4

Major elements analyses for the second set of experiments

| | SiO$_2$ % | Cr$_2$O$_3$ % | TiO$_2$ % | Al$_2$O$_3$ % | Fe$_2$O$_3$T % | MnO % | MgO % | CaO % | Na$_2$O % | K$_2$O % | P$_2$O$_5$ % | LOI % | S % | Total % |
|---|---|---|---|---|---|---|---|---|---|---|---|---|---|---|
| Starting | 2.60 | 47.82 | .352 | 13.0 | 25.5 | 1.05 | 11.1 | .173 | .0260 | <0.042 | <0.21 | #N/A | <0.042 | 102.1 |
| T-2-1 | 2.45 | 49,23 | .358 | 15.0 | 15.6 | .948 | 12.0 | .190 | <0.034 | <0.069 | <0.34 | 1.25 | <0.069 | 97.5 |
| T-2-3 | 2.69 | 50.11 | .346 | 15.7 | 13.8 | 1.07 | 12.7 | .116 | .593 | <0.06 | <0.3 | 1.45 | <0.06 | 99.0 |
| T-2-4 | 2.41 | 46.43 | .314 | 14.5 | 12.2 | 1.03 | 11.8 | .0960 | 2.96 | <0.069 | <0.35 | 7.35 | <0.069 | 99.5 |
| T-2-5 | 2.94 | 43.64 | .275 | 13.2 | 9.40 | .994 | 11.2 | <0.019 | 6.62 | <0.063 | <0.31 | 12.14 | <0.063 | 101.0 |
| T-2-6 | 3.67 | 50.29 | .343 | 14.8 | 14.3 | 1.08 | 12.5 | <0.017 | .322 | <0.057 | <0.28 | 1.27 | <0.057 | 99.0 |
| T-2-7 | 3.02 | 50.37 | .399 | 14.6 | 15.4 | 1.06 | 12.2 | <0.016 | .447 | <0.054 | <0.27 | 2.57 | <0.054 | 100.5 |
| T-2-8 | 3.44 | 49.81 | .345 | 14.2 | 16.6 | 1.05 | 11.9 | <0.017 | .783 | <0.058 | <0.29 | 1.67 | <0.058 | 100.2 |
| T-2-9 | 3.53 | 52.83 | .330 | 20.0 | 5.24 | .453 | 16.1 | <0.017 | .0330 | <0.057 | <0.29 | 0.94 | <0.057 | 99.7 |
| T-2-10 | 3.48 | 52.44 | .336 | 18.2 | 8.73 | .812 | 14.8 | .0220 | .0410 | <0.053 | <0.27 | 0.88 | <0.053 | 100.0 |
| T-2-11 | 3.32 | 52.58 | .339 | 17.5 | 10.1 | .977 | 14.3 | .0150 | .0660 | <0.049 | <0.24 | 0.65 | <0.049 | 100.1 |
| T-2-12 | 3.46 | 51.66 | .348 | 15.8 | 13.6 | 1.08 | 13.1 | .0310 | .161 | <0.047 | <0.23 | 0.54 | <0.047 | 100.2 |
| T-2-13 | 3.07 | 46.18 | .347 | 13.0 | 24.5 | 1.01 | 10.7 | .0220 | .205 | <0.057 | <0.28 | 1.27 | <0.057 | 101.3 |

TABLE 5

Cr/Fe ratios variations at a temperature of 720° C. for time periods varying between 1 and 2 hours

| Sample | T °C. | NaCl % | Time (h) | FCl$_2$ ml/mi | FCO ml/mi | FN$_2$ ml/mi | Fe$_2$O$_3$ % | Cr$_2$O$_3$ % | Cr/F |
|---|---|---|---|---|---|---|---|---|---|
| Starting | 21 | 0 | 0 | 0 | 0 | 0 | 25.5 | 47.8 | 1.88 |
| T12 | 720 | 5 | 1 | 220 | 220 | 110 | 8.44 | 53.1 | 6.29 |
| T11 | 720 | 5 | 1.5 | 220 | 220 | 110 | 6.03 | 53.2 | 8.82 |
| T11 | 720 | 5 | 2 | 220 | 220 | 110 | 3.23 | 54.6 | 16.9 |

Example 1

Selectivity of the Carbochlorination for the Removal of Iron Versus Chromium

This example comprises a set of 4 experiments. The results are presented in Table 2. This Example demonstrates the selectivity of the iron removal by carbochlorination versus chromium according to the method of the present invention. The other major elements are reported in Table 2 for indicative purposes only. The range of temperature tested varied from 250 to 550° C. The chlorinated sample were mixed with a NaCl brine and dried at 180° C. for 30 minutes. The salt content of the chlorinated samples was 5% (w/w). A 10 g sample of chromite ore was placed in a 10 ml porcelain beaker. The beaker was positioned in the center of 60 cm in length silica tube, with an internal diameter of 6 cm. The assembly beaker-silica tube was placed in the furnace and the temperature was raised at the chosen carbochlorination temperature. When the temperature was reached and stable, a Cl$_2$, CO gas mixture was introduced in the furnace on a one to one ratio basis. The carbochlorination step was conducted for 60 minutes. A red brown chlorine vapor formed five minutes after the beginning of introducing the gases in the furnace. This vapor was expelled outside the reactor through the gases flow, where it condensed on the inside wall of the silica tube. At the end of the experiment, the furnace-heating device and the gases flow were stopped. After a cooling period, the solid residue left in the porcelain beaker was analyzed for major and selected trace elements.

Figure 4:
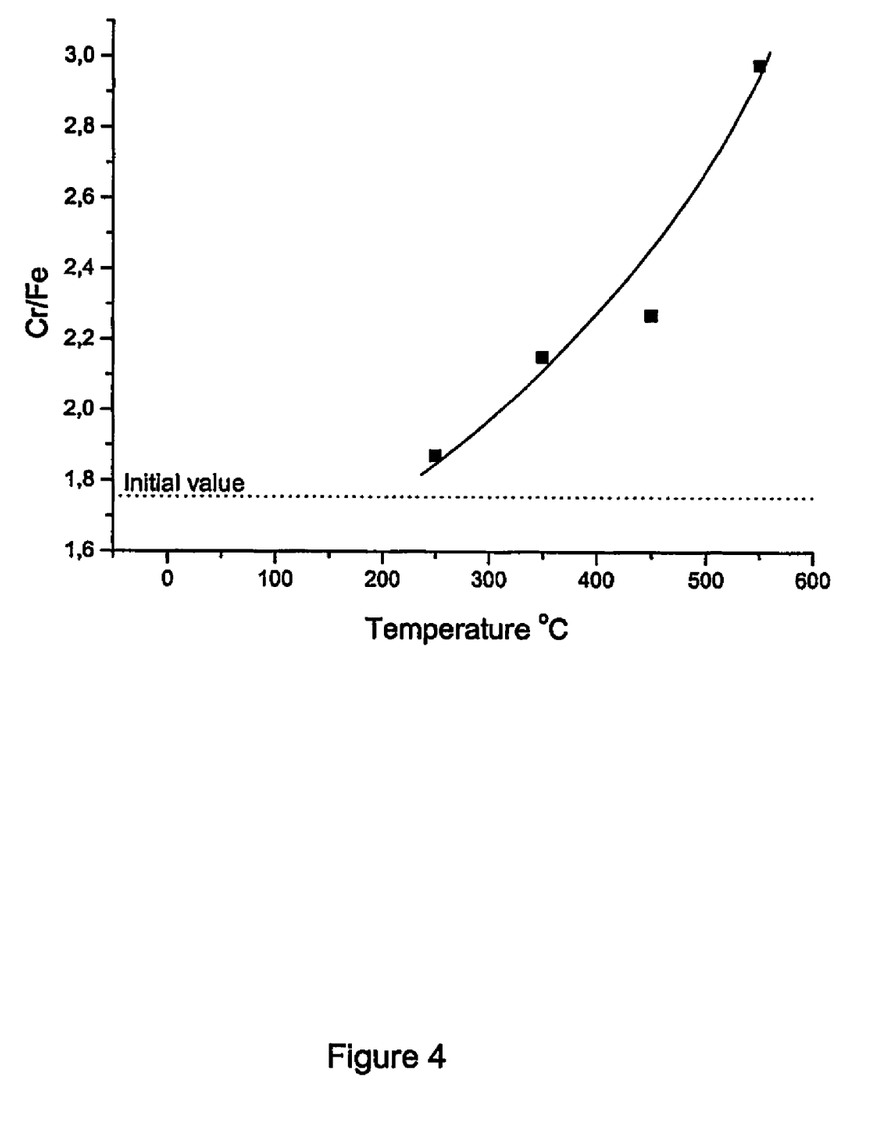
FIG. 4 graphically illustrates variations of the chrome to iron ratios with T° C. during preliminary experiments.

The results presented In Table 2 show that the concentration of $Fe_2O_{3T}$ increased and that of $Cr_2O_3$ decreased in Tests-01-04. These results clearly show the selective removal of iron. The original content of iron decreased gradually with corresponding increases of the carbochlorination temperature from 25.31% in the starting ore to 17.12% in the Test-04 run at 550° C. The chromium content of the samples tested increased from 45.33% in the starting ore to 52.07% in the test-04 sample performed at 550° C. This chrome enrichment was correlated with the weights losses of the samples and therefore reflected the removal of iron from the samples. As expected, the chrome to iron ratios show a positive correlation with the temperature (FIG. 4). The chrome to iron ratio increases from 1.76 in the starting ore up to 2.98 in the Test-04 sample.

Example 2

Identification of the Condensate as $FeCl_3$

The red brown condensate formed on the inside wall of the silica tube (in experiment described in Example 1) was washed out from the tube with water, in which this compound dissolved readily. This solution was analyzed by ICP-AES for major elements and by UV spectroscopy for the oxidation state of iron. Analyzis of the solution established the presence of iron as the only major element. Other elements were present at the trace level. Iron oxidation state was determined as $Fe^{+3}$ by UV. These observations further demonstrated that iron was removed as gaseous $FeCl_3$ during the carbochlorination of the chromite ore.

Example 3

Effect of the Salt Addition on the Selective Removal of Iron Versus Chromium

The effect of the NaCl salt addition on the carbochlorination was tested by adding incremental quantity of NaCl to samples T-2-1 to T-2-5. The experimental conditions for these five samples are summarized in Table 3. Carbochlorination temperature was set at 600° C., the reaction time at 2 hours, and the quantity of NaCl salt addition varied from 0 to 15.0% (w/w). Results presented in Table 3 show a direct increase in the chrome to iron ratio in relation with the quantity of salt added to the feed. In sample T-2-1, with no salt addition, the chrome to iron ratio reached a value of 3.16 after the chlorination step, an increase of 1.75 compared to the original ore. In sample T-2-5 to which was added 15% NaCl (w/w), the chrome to iron ratio was 4.52 at the end of the chlorination experiment. This corresponds to a 47% increase in the Cr/Fe when compared to sample T-2-1. This strong Increase of the carbochlorination efficiency is attributed to the catalyst effect of the mixture NaCl and $FeCl_3$ as explained before.

Example 4

Figure 5:
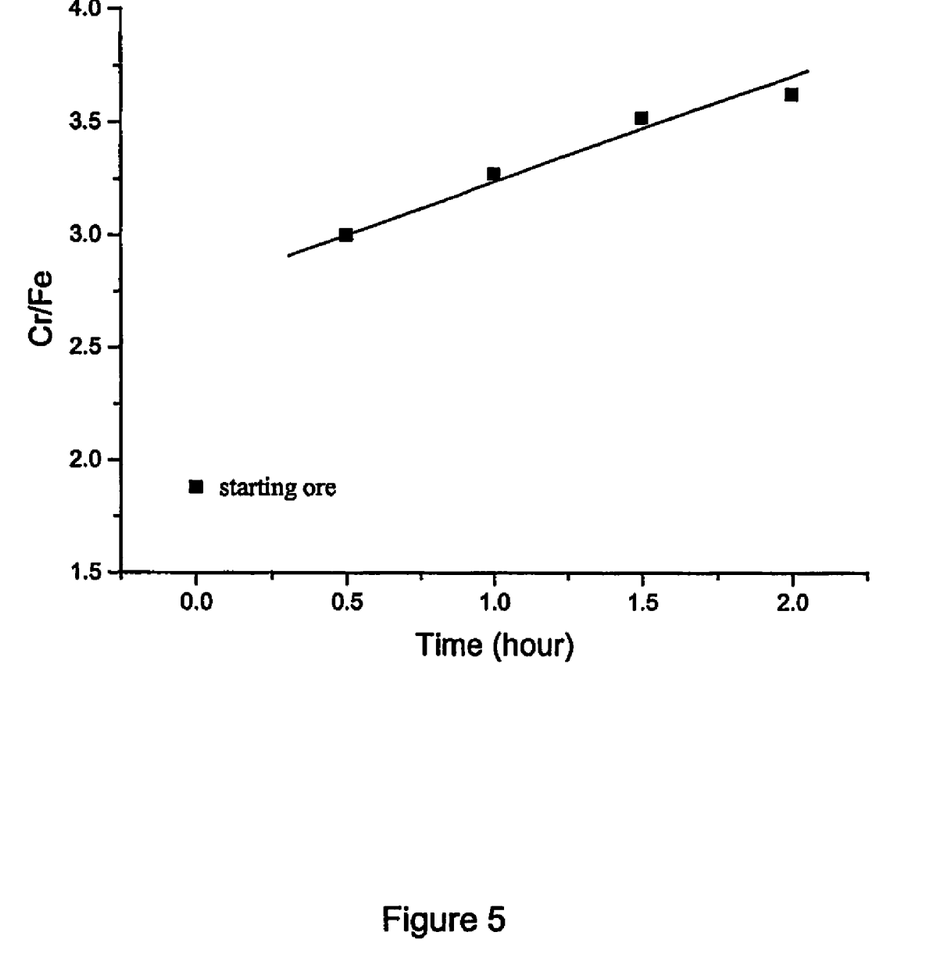
FIG. 5 graphically illustrates variations of chrome to iron ratios with time. The temperature used was 600° C. and the NaCl concentration was 4.8% (w/w)

Effect of Increasing the Reaction Time on the Selective Removal of Iron Versus Chromium The effect of increasing the reaction time on the selective removal of iron was tested by 0.5 hour time increments. Total reaction time varied from 0.5 hour to 2.0 hours. Samples were tested as follows, 0.5 hour for T-2-8, 1.0 hour for T-2-7, 1.5 hours for T-2-6 and 2.0 hours for T-2-3. Experimental conditions used for these samples are reported in Table 3. The chrome to iron ratios increased from 1.88 for the starting ore, to 3.63 for T-2-3 after a reaction time of 2 hours. The chrome to iron ratios increase is positively correlated to the reaction time (FIG. 5).

Example 5

Effect of Using a Temperature Higher than the Melting Point of $FeCl_2$ on the Selective Removal of Iron Versus Chromium The temperature of 673° C. was selected as slightly superior to the melting point of $FeCl_2$ (670° C.). The total reaction time varied from 0.5 hour to 2.0 hours with a time increment of a half hour for each of samples were T-2-9 to T-2-12 as in Example 4. The experimental conditions and the results for these experiments are reported in Table 3. It is postulated that $FeCl_2$ is formed at some point during the chlorination and subsequently transformed in $FeCl_3$ according to the reaction $FeCl_2 + 1/2Cl_2 \Rightarrow FeCl_3(g)$. At temperature below the melting point of $FeCl_2$, the presence of this compound as a solid can act as a blocking agent between the chlorination agent and the chromites reaction sites. When melted, $FeCl_2$ can actively promote Fe extraction in the chlorination catalytic system earlier described herein. The results presented in Table 2 indicated that bringing the chlorination temperature to 673° C. has a very decisive Impact on the selective removal of iron versus chromium, with the production of a chrome to iron ratio up to 10 for a two hours chlorination time. The relation between the chrome to iron ratio versus chlorination time is presented in FIG. 6.

Figure 6:
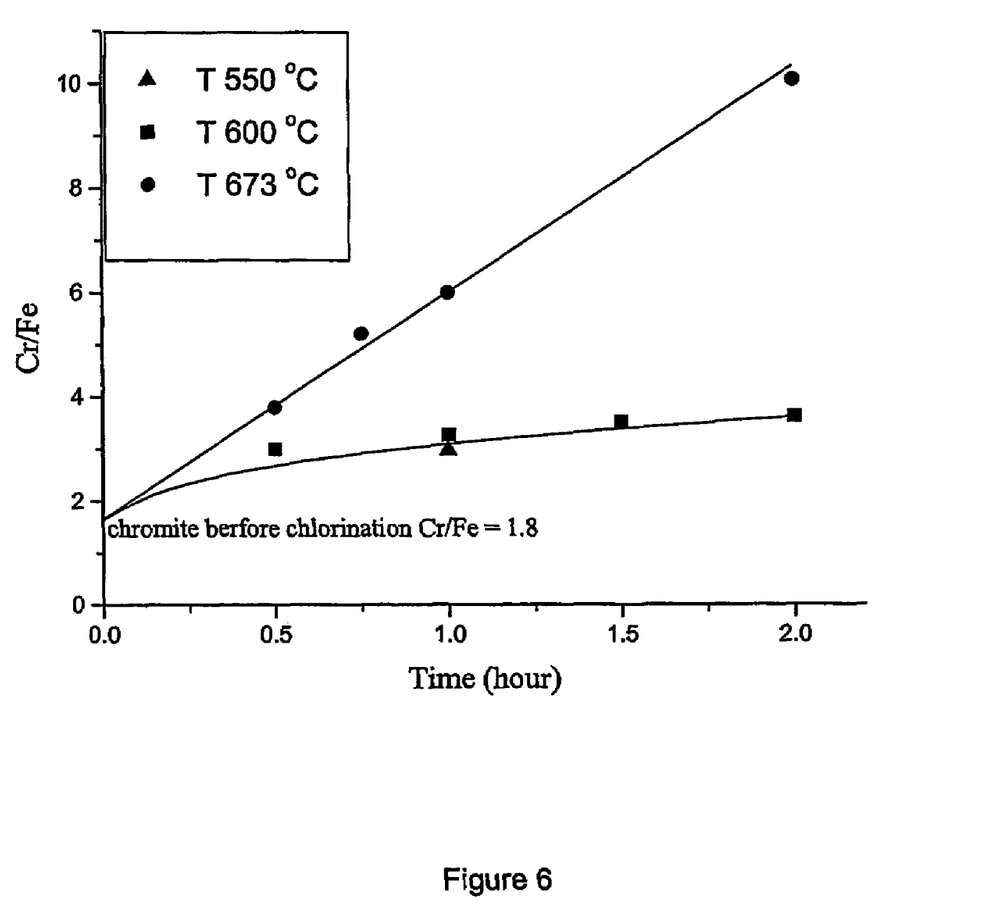
FIG. 6 graphically illustrates variations of the chrome to iron ratios with reaction time. Triangle: T=550° C.; square: T=600° C.; circle: T=673° C.

A comparison between results for T=550° C. and T=600° C. with results for T=673° C. is also presented in FIG. 6. Carbochlorinations conducted at 673° C. showed a significant increase in the chrome to iron ratios when compared to those conducted at lower temperatures. Moreover, the chrome to iron ratios between experiments conducted at 550° C. and 600° C. show a relatively small increase, namely from 2.98 to 3.27 for a temperature difference of 50° C. while that obtained for experiments conducted at 673° C. is much larger for a temperature difference of 73° C., namely 2.98 to 6.00. Without being limited to such hypothesis, it is proposed that the important increase in the chrome to iron ratios for the experiments conducted at 673° C. are attributed to the melting of $FeCl_2$ and volatilization of $FeCl_3$. This melting allowed $FeCl_2$ to play a role in the catalytic system comprising NaCl, $FeCl_2$ and $FeCl_3$.

Example 6

Effect of the Carbochlorination for Selectively Removing Iron without Altering the Major Chemical Components of the Chromite In the second set of experiments, the major elements concentrations and the weight losses were measured and presented at Tables 3 and 4. When correcting for the weight losses due to the losses of iron (under the heading "weight losses" in Table 3), no apparent removal of other major elements was noticed by comparison to the starting composition. Although, the $Cr_2O_3$ contents of samples T-24 and T-2-5 show small losses, they are attributed to a dilution effect caused by NaCl. In these two samples, the concentration of salt was especially high, 10 and 15%, respectively. MnO and CaO also showed slight decreases in their concentrations. These two components are however generally present at concentrations lower than 1% in chromites and their partial removal is not detrimental to the present invention.

Example 7

Figure 7:
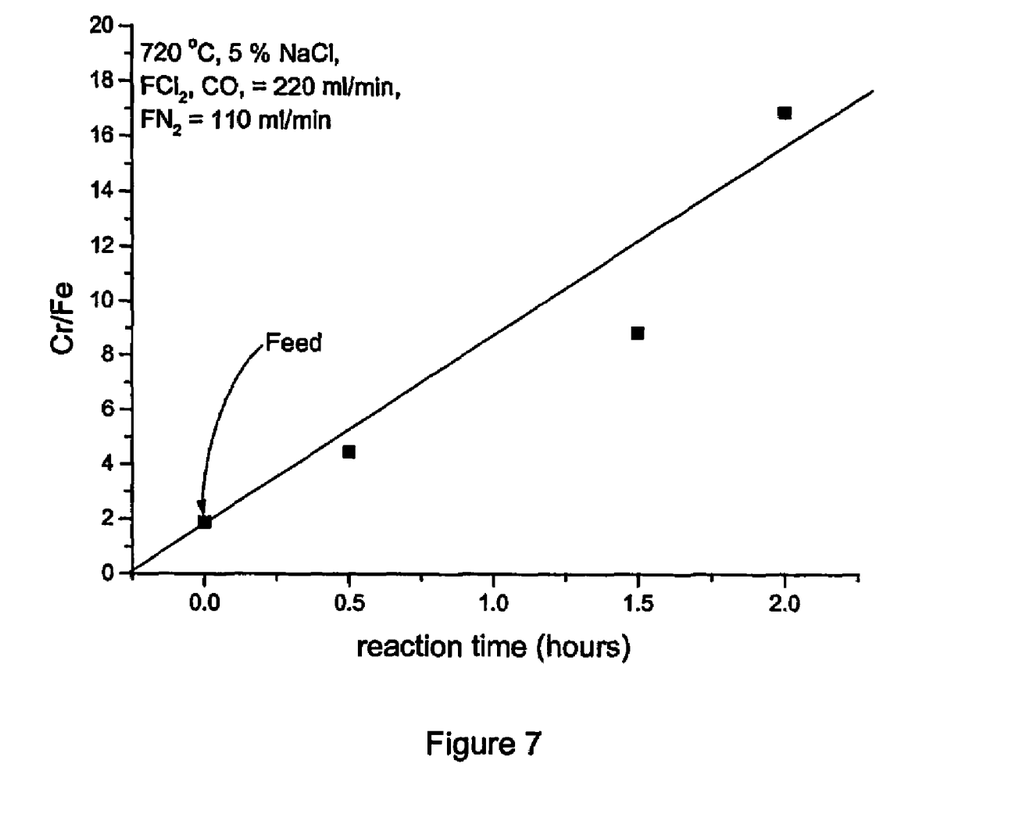
FIG. 7 graphically illustrates variations of the chrome to iron ratios with reaction time at a temperature of 720° C.

Chromium to Iron Ratio Increase Versus Temperature and Duration of the Reaction Experiments were conducted at 720° C. to further investigate the chromium to iron ratio increase at higher temperatures. The experimental conditions were the following: NaCl addition 5%, $Cl_2$ and CO flow rate=220 ml/min, $N_2$ flow rate=110 ml/min, the reaction time was varied from 0 to 2 hours. The results are presented in Table 5 above and FIG. 7. An increase of the time of reaction correlated with an increase of chromium to iron ratios. After two yours, the Cr/Fe reaches 16.9 for a starting value of 1.8 in the feed. The $Cr_2O_3$ content of the material showed no sign of chromium removal during the experiment and increased from 4 to 55%, as shown in above Table 5.

Although the invention has been described above with respect to a few representative examples and drawings, it will be evident in the person skilled in the art that it may be modified and refined in various ways. It is therefore wished to have it understood that the present invention should not be limited in scope, except by the terms of the following claims:

What is claimed is:

1. A method for increasing the chrome to iron ratio of a chromite product selected from the group consisting of ore and ore concentrate comprising the steps of
    a. mixing the chromite product with at least one salt so as to produce a mixture, whereby the concentration of salt in the mixture is selected to induce the selective chlorination of iron; and
    b. chlorinating the mixture in the presence of CO at a temperature sufficient to induce the formation of a thin film of a melt around the chromite product and at a temperature able to promote the selective chlorination of iron, and forming gaseous $FeCl_3$,
    whereby an iron impoverished chromite product is yielded having an increased chromite to iron ratio as compared to that of the chromite product.

2. The method of claim 1, wherein said temperature is between about 157° and about 750° C.

3. The method of claim 1, wherein the at least one salt is selected from the group consisting of NaCl, KCl and $MgCl_2$ and a combination thereof.

4. The method of claim 1, wherein the salt is NaCl and forms about 5% to about 10% w/w of the mixture.

5. The method of claim 1, wherein the salt is NaCl and forms about 5% w/w of the mixture.

6. The method of claim 1, wherein the temperature is between about 250° and about 720° C.

7. The method of claim 1, wherein the temperature is between about 670° and about 720° C.

8. The method of claim 1, wherein the ratio of $Cl_2/CO$ is between about 0.5 and about 1.5.

9. The method of claim 1, wherein the mixture is dried before chlorination.

10. The method of claim 1, wherein $N_2$ is used as a carrier gas during chlorination.

11. The method of claim 1, wherein the duration of the chlorination is about 30 minutes to about 2 hours.

12. The method of claim 1, wherein the duration of the chlorination is about 2 hours.

13. A method for increasing the chrome to iron ratio of a chromite product selected from the group consisting of ore and ore concentrate comprising the steps of
    a. mixing the chromite product with NaCl so that a mixture is produced having about 5% to about 10% NaCl w/w; and
    b. chlorinating the mixture in the presence of CO at a temperature sufficient to induce the formation of a thin film of a melt around the chromite product and at a temperature able to promote the selective chlorination of iron, and forming gaseous $FeCl_3$,
    whereby an iron impoverished chromite product is yielded having an increased chromite to iron ratio as compared to that of the chromite product.

14. The method of claim 13, wherein said temperature is between about 157° and about 750° C.

15. The method of claim 13, wherein the salt is NaCl and forms about 5% w/w of the mixture.

16. The method of claim 13, wherein the temperature is between about 670° and about 720° C.

17. The method of claim 13, wherein the ratio of $Cl_2/CO$ is about 0.5 and about 1.5.

18. The method of claim 13, wherein the mixture is dried before chlorination.

19. The method of claim 13, wherein $N_2$ is used as a carrier gas during chlorination.

20. The method of claim 13, wherein the duration of the chlorination is about 30 minutes to about 2 hours.

21. The method of claim 13, wherein the duration of the chlorination is about 2 hours.

22. A method for extracting iron from a chromite product selected from the group consisting of ore and ore concentrate comprising the steps of
    a. mixing the chromite product with at least one salt; and
    b. chlorinating the mixture in the presence of CO at a temperature sufficient to induce the formation of a thin film of a melt around the chromite product so as to promote the chlorination of iron, and forming gaseous $FeCl_3$,
    whereby an iron impoverished chromite product is yielded.

* * * * *

UNITED STATES PATENT AND TRADEMARK OFFICE
CERTIFICATE OF CORRECTION

| | | |
|---|---|---|
| PATENT NO. | : 7,658,894 B2 | Page 1 of 1 |
| APPLICATION NO. | : 10/544214 | |
| DATED | : February 9, 2010 | |
| INVENTOR(S) | : Mario Bergeron et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 839 days.

Signed and Sealed this

Fifth Day of October, 2010

David J. Kappos
*Director of the United States Patent and Trademark Office*